(No Model.)
E. THOMSON.
METHOD OF ELECTRIC WELDING.
No. 444,928. Patented Jan. 20, 1891.
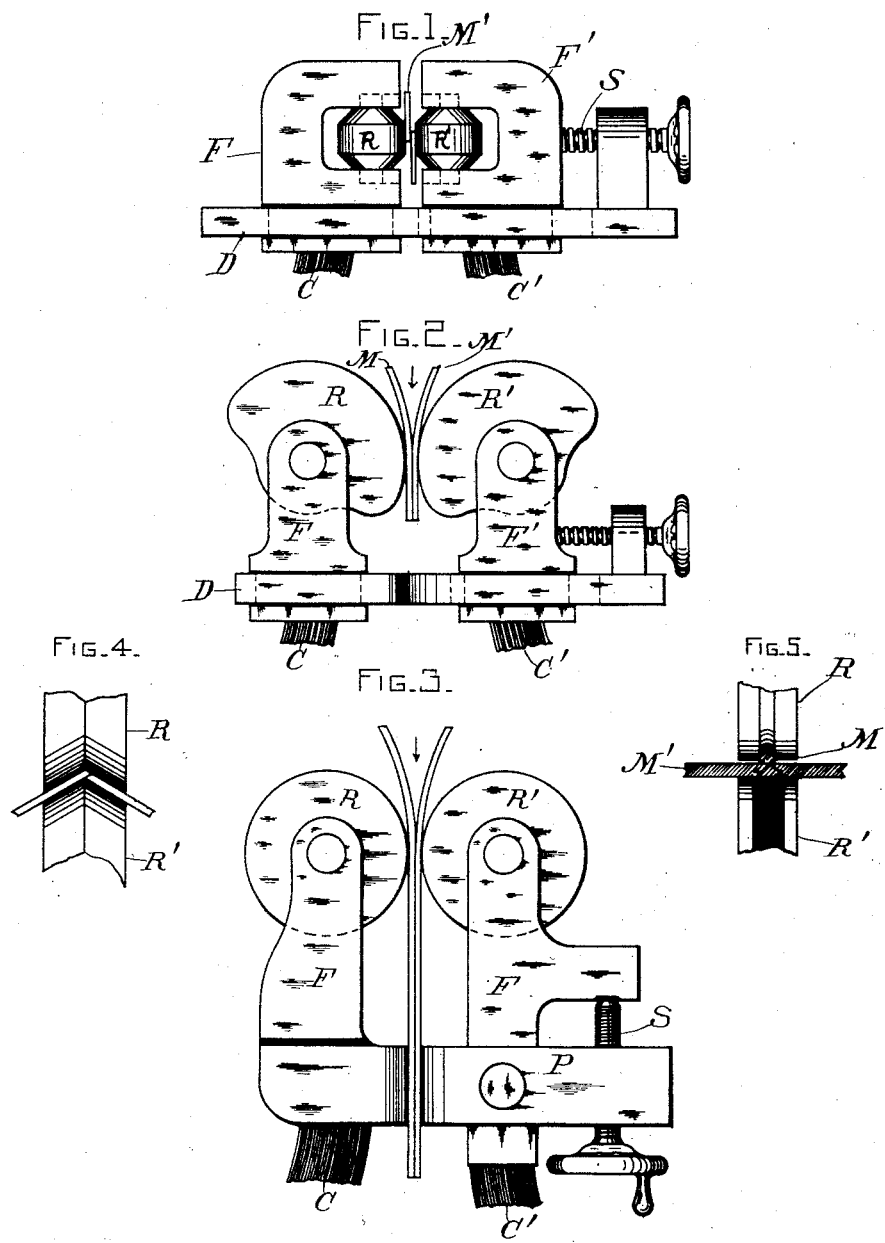
WITNESSES.
INVENTOR.
Elihu Thomson
By H. C. Townsend
Atty

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 444,928, dated January 20, 1891.

Application filed June 14, 1890. Serial No. 355,502. (No model.)

*To all whom it may concern:*

Be it known that I, ELIHU THOMSON, a citizen of the United States, and a resident of Swampscott, in the county of Essex and State of Massachusetts, have invented a certain new and useful Method of Electric Welding, of which the following is a specification.

My invention relates to a process of electric welding in which the surfaces to be welded are pressed together to from a union, and the heating of the surfaces to the desired plasticity is effected by means of an electric current passed across the joint or line of proposed union.

My present invention relates more particularly to the process of joining or welding together strips, sheets, plates, or bars of metal where it is desirable to form a joint of considerable length, and is especially applicable to the welding of plates together at their edges, instead of riveting, to the welding of ribs or strips of metals to plates for the purpose of strengthening the same, to the formation of pipes by welding a longitudinal joint, to the welding of half-round or other shaped strips on one or both sides of a plate or strip of metal, and to other similar classes of work, as will be obvious.

My present invention consists, essentially, of forming an elongated joint by the electric welding process by feeding the work in the longitudinal direction of the joint through suitable pressure devices, the work being properly arranged, so that the pressure devices will press the surfaces to be welded together and simultaneously passing an electric current through the work at the point of pressure.

In carrying out my invention I prefer to use as the pressure devices suitable rolls or segments of rolls which are included in the heating electric circuit and from which the current passes to the work and across the surfaces pressed against one another by such rolls. In combination with the rollers or similar devices I employ any usual or proper means, such as screws, levers, or other devices for forcing them toward one another. As the work is passed through such rolls with a continuous motion, each point as it comes between the rolls is heated and the surfaces pressed together by the pressure applied in a line transverse to the plane of the surfaces to be welded.

In the accompanying drawings I have illustrated, in Figures 1, 2, and 3, various forms of apparatus suitable for carrying out my invention. Fig. 4 is an edge view of two rolls of special form that may be used in carrying out my invention. Fig. 5 illustrates rolls or pressure devices of a special construction invented by me and hereinafter claimed.

Referring to Fig. 1, R R' indicate two rolls, of conducting material, which are mounted in suitable frames F F', and are supported upon but insulated from a bed-plate D. The frames F F', being of conducting material, may be connected with any suitable source of electric current of large volume through cables C C', or by other means, so that an electric current may be caused to pass from one roll to the other, and through any pieces of conducting material held between them in pressure-contact. The frame F' may be made to slide in the bed-plate D and may be forced toward the opposite roll by means of the screw S, so that the desired pressure may be applied. In this figure I have illustrated the application of my invention to the welding of the edges of two plates M M' together, the plates being shown in end view as in position between the rolls ready to be fed between them in the longitudinal direction of such plates. The edges are slightly overlapped, as shown, and the plates, being in position between the rolls, may be squeezed together by means of the screw S, thus forming an electric contact between them. The electric current being now turned on as it passes from one roller to the other and across the point of pressure will heat the work to the welding temperature and soften the same slightly, after which the screw may be given a few more turns to effect a solid union. The work, hav ing been thus started, may now be moved along through or between the rollers, so as to bring successive parts of the joint into position to be pressed and heated at the same time. By this operation the metal will become thoroughly united as it passes through and out from between the rolls. It is obvious that the speed of the operation may be varied by varying the rate of heating and the rapidity at which the work may be fed through the rolls.

In Fig. 2 I have shown segments of rolls R R' to be employed in special work, as in the joining face to face of two strips or plates M M', which are of comparatively limited length in the direction of the joint. In this case the work is supposed to be fed down vertically through the rollers and through the bed-plate. The length of the strips and of the joint between them is in this instance supposed to be of about the same length as the face of the segment, so that the pieces may be drawn or forced through and the whole length united by the time it has passed between the segments. The frames holding the segments or rolls are mounted as before described in connection with Fig. 1, and current may be supplied to them in the manner indicated, as by cables C C', or in any other desired way. In all cases the work may be fed or passed between the rolls by means of power applied to the rolls or segments, in which case the friction of the rolls on the metal will draw the work through. If desired, power may be applied directly to the metal itself, the latter method being somewhat preferable.

In Fig. 3 an apparatus slightly modified from that of Fig. 1 is illustrated. Here the work is supposed to be fed down vertically through the bed-plate and between the rolls, and the movable frame of the roll R' is a pivoted frame instead of a sliding frame, as in Fig. 1. The point of pivoting is indicated at P. The pressure-screw S is insulated from the frame F' by engaging with a piece of insulating material, as indicated, let into the frame.

It is obvious that a large variety of work may be done by this process. Thus, as indicated in Fig. 4, the method may be applied to the formation of joints between pieces arranged to make V-shaped troughs or plates, the two parts being welded together at an angle, as represented, but the pressure being applied, as in the cases before mentioned, in such way as to press the surfaces to be welded into contact. The face of the roller may obviously be of any suitable form conforming to the ultimate shape of the finished article desired, and may then be used to shape or conform a flat strip or strips of metal into different shapes in cross-section simultaneously with the welding operation. In such instances, however, it would be necessary to employ a current of somewhat larger volume in order to heat the whole cross-section of the work that is exposed to the surface of the rollers in addition to the parts at or near the joint.

In Fig. 5 I have illustrated apparatus that may be used in welding a strip or rib M to the surface of a plate or strip M' that is wider than said rib or is of a different shape therefrom. The roller rest or abutment R' is made with an insulating face or surface immediately beneath the work or in the line with the smaller piece M, as indicated, but is of conducting material, to one side of such line. The effect of this is to cause the current to take the paths indicated by the arrow, so as to take a path through the surfaces of the strip or plate M' near the edges of the work or joint, thereby causing proper heating and joining of the strip or rib M at its edges as well as at the inner or flat surface thereof.

What I claim as my invention is—

1. The herein-described method of forming an elongated joint by the electric welding process, consisting in feeding the work in the longitudinal direction of the joint through suitable pressure devices while properly arranged, so that the pressure devices will press the surfaces to be welded against one another, and simultaneously passing an electric current through the work at the point of pressure.

2. The herein-described improvement in forming electrically-welded joints, consisting in lapping the pieces to be welded upon one another, passing the lapped pieces through or between suitable pressure devices, forming the electrodes of an electric heating-circuit, and applying pressure to effect the weld.

3. The herein-described improvement in forming longitudinal seams or joints between strips or pieces of metal, consisting in feeding the strips or pieces through suitable rolls while arranged in proper position to be pressed together by such rolls, and at the same time passing a heating electric current from one roll to another and through the surfaces to be welded, as and for the purpose described.

4. The herein-described improvement in electric welding and shaping of metals, consisting in feeding two or more strips of metal to be welded together through forming or shaping rolls in the longitudinal direction of the joint, pressing the surfaces to be welded together by such rolls, and at the same time passing a current from roll to roll of sufficient volume to heat the strips to plasticity, so as to effect the weld and at the same time shape the metal to the desired form in cross-section.

5. In an electric welding apparatus, an abutment or rest for the work, made of insulating material at its surface immediately beneath the parts to be welded and of conducting material to one side of it, so as to cause a current to pass or be delivered through surfaces near the edge of the work, as and for the purpose described.

6. In an electric welding apparatus, a pressure and conducting roll a part of the surface of which is a conductor, while another part is a non-conductor, for the purpose of directing the current through the work under pressure.

Signed at Lynn, in the county of Essex and State of Massachusetts, this 11th day of June, A. D. 1890.

ELIHU THOMSON.

Witnesses:
 JOHN W. GIBBONEY,
 DUGALD McKILLOP.